US006857023B2

United States Patent
Rivadalla et al.

(10) Patent No.: US 6,857,023 B2
(45) Date of Patent: Feb. 15, 2005

(54) SYSTEM USES AN INTERFACE CONTROLLER FOR MANAGING OPERATIONS OF DEVICES THAT EACH HAS A UNIQUE COMMUNICATION PROTOCOL

(75) Inventors: Christian Rivadalla, Scottsdale, AZ (US); Paolo Hutchison, Chandler, AZ (US); David Schwartz, Gilbert, AZ (US)

(73) Assignee: Pegasus Solutions, Inc., Dallas, TX (US)

( * ) Notice: Subject to any disclaimer, the term of this patent is extended or adjusted under 35 U.S.C. 154(b) by 561 days.

(21) Appl. No.: 09/800,122

(22) Filed: Mar. 5, 2001

(65) Prior Publication Data

US 2002/0035648 A1 Mar. 21, 2002

Related U.S. Application Data

(60) Provisional application No. 60/199,605, filed on Apr. 25, 2000.

(51) Int. Cl.$^7$ .............................................. G06F 15/16
(52) U.S. Cl. ..................................... 709/230; 709/217
(58) Field of Search .............................. 709/220, 223, 709/105, 203, 230, 217; 717/147; 715/526

(56) References Cited

U.S. PATENT DOCUMENTS

| 5,960,200 | A | * | 9/1999 | Eager et al. | 717/147 |
| 6,038,590 | A | | 3/2000 | Gish | 709/203 |
| 6,185,590 | B1 | * | 2/2001 | Klein | 715/526 |
| 6,269,396 | B1 | * | 7/2001 | Shah et al. | 709/223 |
| 6,581,088 | B1 | * | 6/2003 | Jacobs et al. | 709/105 |

* cited by examiner

Primary Examiner—Le Hien Luu
(74) Attorney, Agent, or Firm—Christopher J. Rourk; Godwin Gruber, LLP

(57) ABSTRACT

An interface controller for managing operation of a plurality of devices via a wide area network is provided. Each of the devices has a unique communication protocol associated therewith. A network communications layer is provided for communicating with the plurality of devices via the wide area network and a client application associated with the plurality of devices. An information processing layer is also provided for communicating with the network communications layer. The information processing layer has a set of objects corresponding to each of the plurality of devices. The information processing layer is also for interacting with a data access layer on behalf of each of the plurality of devices using the corresponding objects. Interaction between the information processing layer and the data access layer on behalf of all of the plurality of devices is governed by a single set of rules.

26 Claims, 9 Drawing Sheets

SYSTEM USES AN INTERFACE CONTROLLER FOR MANAGING OPERATIONS OF DEVICES THAT EACH HAS A UNIQUE COMMUNICATION PROTOCOL

RELATED APPLICATION DATA

The present application claims priority from U.S. Provisional Patent Application No. 60/199,605 for INTERNET INTERFACE CONTROLLER filed on Apr. 25, 2000, the entire disclosure of which is incorporated herein by reference for all purposes.

A CD-ROM appendix, Appendix A, having a single file named COMPUTER_PROGRAMMING_SEQUENCE_LISTING.ANS, totaling 51.5 kilobytes, and created on May 20, 2004, consisting of a computer program listing constitutes a part of the specification of this invention, pursuant to 37 C.F.R. Sections 1.77 and 1.96. the CD-ROM appendix being incorporated by reference herein for all purposes.

A portion of the disclosure of this appendix document contains material that is subject to copyright protection. The copyright owner has no objection to the facsimile reproduction by anyone of the patent disclosure, as it appears in the Patent and Trademark Office files or records, but otherwise reserves all copyrights whatsoever.

BACKGROUND OF THE INVENTION

The present invention relates to methods and apparatus for controlling the transfer of information between remote devices across a wide area network. More specifically, the present invention provides an interface which employs standard internet protocols and communication mechanisms to enable communication among disparate devices and systems.

Currently, most property management systems in the hospitality industry employ a dedicated terminal to control each of the various device types in the system. These device types typically include a phone system, an entertainment/movie system, a security system, an environmental and energy management system, an accounting system, a reservation system, etc. Typically, these dedicated terminals each communicate with a central database at the property using client/server or Unix connections.

A significant drawback associated with this paradigm relates to the disparate nature of the communication protocols associated with each of the systems which access the central database. That is, for historical reasons, each of the many systems in a typical hotel has its own unique communication protocol and/or data format. Integrating these systems into a single property management system has become desirable in recent times. However, the problems associated with integrating the many incompatible hotel subsystems are many.

As mentioned above, the current approach is to use dedicated terminals which allow each of the devices or subsystems to access the central database. This requires essentially redundant hardware for each of the property's many systems. In addition, each of the dedicated terminals must have its own unique software interface to facilitate communication with the central database which must be supported by information systems personnel.

Most businesses today (and this is especially true of the hospitality industry) are spending an unacceptable amount of resources attempting to integrate and maintain such systems which takes resources away from their core businesses. Most would like to (and indeed many have) outsourced certain functions to remote infrastructure management sites which manage the functions either remotely or locally (e.g., hosting) via the Internet. However, for industries in which the systems being integrated are characterized by a variety of disparate communication protocols, this approach has been problematic.

It is therefore desirable to provide techniques by which devices and systems having disparate communication protocols and data formats may be more efficiently managed.

SUMMARY OF THE INVENTION

According to the present invention, methods and apparatus are provided which facilitate bidirectional device management over wide area networks, e.g., the Internet. The present invention provides software objects which manage the communication between source and target devices/platforms regardless of disparities between the various sources and targets. Thus, for example, where multiple devices (i.e., sources) are being managed from a single platform (i.e., target), once the rules of operation of the target platform (e.g., a database) have been set up, the present invention enables all of the source devices to interact with the target platform according to the same rules regardless of their individual protocols.

Thus, the present invention provides an interface controller for managing operation of a plurality of devices via a wide area network. Each of the devices has a unique communication protocol associated therewith. A network communications layer is provided for communicating with the plurality of devices via the wide area network and a client application associated with the plurality of devices. An information processing layer is also provided for communicating with the network communications layer. The information processing layer has a set of objects corresponding to each of the plurality of devices. The information processing layer is also for interacting with a data access layer on behalf of each of the plurality of devices using the corresponding objects. Interaction between the information processing layer and the data access layer on behalf of all of the plurality of devices is governed by a single set of rules.

According to one embodiment, a client system for enabling management of the operation of a plurality of associated devices by a remote interface controller via a wide area network is also provided. Each of the plurality of devices has a unique communication protocol associated therewith. The client system includes a client application for communicating with each of the plurality of devices and the interface controller via the wide area network. The client application also is for enabling the interface controller to interact with at least one database on behalf of all of the plurality of devices according to a single set of rules.

According to another embodiment, an information provider system for communicating with an interface controller via a wide area network is also provided. The interface controller is for managing operation of a plurality of devices via the wide area network, each of the devices having a unique communication protocol associated therewith. The information provider system includes a data access layer and at least one database. The data access layer is configured to facilitate interaction by the interface controller with the at least one database on behalf of all of the plurality of devices according to a single set of rules.

A further understanding of the nature and advantages of the present invention may be realized by reference to the remaining portions of the specification and the drawings.

DETAILED DESCRIPTION OF SPECIFIC EMBODIMENTS

Figure 1:
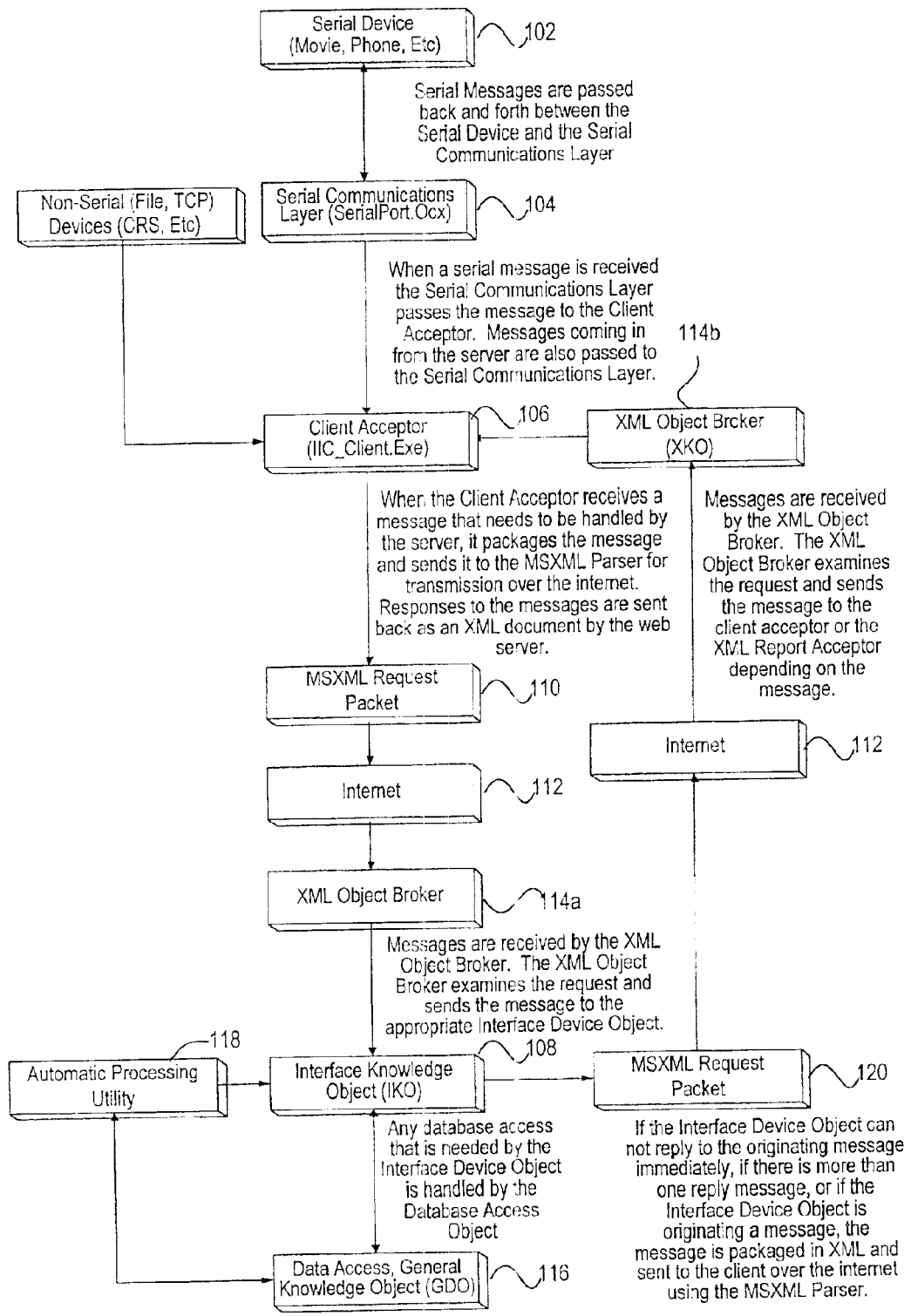
FIG. 1 is an information flow diagram for a specific embodiment of the present invention in which the present invention facilitates communication between a plurality of devices and a remote database.

Specific embodiments of the present invention will now be described with reference to the hospitality industry. It will be understood, however, that the general principles of device and interface management described herein are applicable to a much broader range of implementations. The scope of the present invention should therefore not be limited by the specific embodiments described herein.

To help with the understanding of some of the terms used herein, a Glossary of Terms has been attached hereto following the Appendix.

The Internet Information Controller (IIC) is an application that is designed to send, receive, initiate and respond to data from remote devices across the Internet. According to a specific embodiment, the IIC facilitates communication between devices (e.g., movie systems, pbx phone systems, etc.) at one or more hotel properties and a property management system existing across the Internet, at a hotel property, or anywhere else in the world. The IIC accomplishes this using Internet standard protocols and communications mechanisms. This makes it possible to allow third party vendors to talk to the property management system without having to use any proprietary protocols or standards.

The present invention has eliminated the requirement for the communication at the property level to individual dedicated terminals. Rather, the device management function has been taken through the TCP/IP pipe to a remote platform which is capable of managing multiple devices/interfaces at multiple remote locations. That is, the logic which typically resides in the dedicated terminal is removed from the property and enabled on the remote platform. Information from each of the devices being managed is encrypted and transmitted over the Internet to the remote platform.

This is accomplished using the IIC, a device specific manager which can manage a variety of different device types in parallel. So, for example, in a typical retail setting there might be a device for tracking inventory and a device for processing credit cards. Each has its own interface and unique processes which are likely incompatible with the other. The IIC can manage both devices in parallel and tailor the protocols with which it communicates with each device to be compatible with the device's own protocols. As will be described, this is accomplished using the IIC's proprietary connection layer. The connection layer is configured to handle the custom protocols which are unique to each of the disparate devices and systems. In the hospitality industry, for example, such devices may include phone systems, movie systems, environmental and energy management systems, security and building access systems, financial and business management systems, reservation systems, etc.

In the specific embodiments described herein, the Interface Knowledge Object (IKO) is the heart of the IIC, it communicates with multiple devices and/or multiple sites and enables the devices and sites to access a common database. When the IKO receives a request from a remote device, it instantiates a variety of other objects which it needs to communicate with that specific device.

A specific example may be illustrative. In this example, the remote property management platform is connected to three devices at a particular property including, for example, a movie system, a phone system, and a credit card system. When any of these devices needs to access a shared database at the property management platform, it sends a message over a wide area network, e.g., the Internet, to the IKO layer of the IIC. In the case of the movie system, a request might be sent out for the transactions for a particular room number. The IKO receives the request, determines from what type of device the request originated, retrieves the requested information, and communicates the retrieved information to the requesting device in the appropriate protocol (which corresponds to the determined device type). In addition, the IKO may be connected to multiple database structures, each of which may correspond to a separate communication protocol. So, generally speaking, the present invention enables the transparent communication of multiple devices with any number of databases using multiple communication protocols.

According to various specific embodiments, the IKO also receives notifications when changes are made to the database(s) which may require action on the IKO's part, e.g., an announcement to a device. So, for example, when a guest checks in, the entry for the room in a database is modified to reflect that the room is now occupied. This change in the database may be accomplished, for example, via a web application at the property which connects to the database. The IKO is notified of the change and checks through a list of interfaces to which it is connected to determine whether any of them require an announcement that a guest is now in the corresponding room, e.g., the phone system may require such an announcement as a prerequisite for initializing the phone in that room. That is, when the check-in is accomplished via the web application, there is a trigger on the database which causes a record to be written to an announcement table and the IKO is notified. The IKO then prepares an eXtensible Markup Language (XML) transmission with the protocol of the device requiring the announcement and send the announcement to the device.

Referring now to FIG. 1, a specific embodiment is depicted in which the IIC facilitates communication between many remote serial devices (e.g., serial device 102) and a database (not shown). According to this embodiment, all the serial devices exist at various hotel properties and the database is hosted at a central location.

When a serial message comes in from a device 102 at the property all serial protocol is handled by the SerialPort.OCX 104, which is a generic serial communications layer, that verifies the messages coming in are properly formed, e.g., they meet all protocol and BCC type standards for the device that sending message. If the message is well formed it passes it to the IIC Client 106 which facilitates communication with the IIC across the Internet.

When the IIC Client 106 receives the message it packages it up in XML with all the necessary information needed by the Interface Knowledge Object (IKO) to process the message (110). It then does a HyperText Transfer Protocol (HTTP) post to the IKO server (e.g., via Internet 112) and waits for a response.

When the IKO Server receives the message it is first processed by the XML Object Broker or Knowledge Object (XKO) 114a, which reads the XML packet and determines which IKO object 108 should handle the request. It then instantiates the appropriate IKO Object 108 and passes the message to it. There is a set of IKO Objects 108 for each class of device. According to the current embodiment, the classes include Movie, Phone, PBX, Voicemail, Keys, Energy Management, Food & Beverage, CRS, In Room Computer, Accounting, and Credit Card. When the message is sent to the IKO 108, the IKO 108 parses it, processes it, and if necessary sends a response to the message.

If, for example, a post message comes in from a movie system, the IKO looks at the message, determines that it is a post message, and verifies that there is a guest in the room (using the General Data Objects (GDO) 116 to access the database) and that all the necessary information is available to charge the room. Then the IKO updates the property management system database with the new charge and sends a response back to the device stating that the charge was successfully made. If the response is only one or two messages the IKO sends the response in XML to the HTTP response buffer on the web server so that the device gets an immediate reply during it's posting call. If, on the other hand, the response is a long series of messages (i.e. a resynchronization of all the rooms in the hotel) the IKO posts the initial response message to the HTTP response buffer and then initiates new messages and sends them separately to the IIC Client 106 as they are generated.

When events happen that are initiated by activity at the property management system, like a guest checking into the hotel, there has to be a way to let the devices at the property know about it. With the IIC this is handled by an announcement table in the database and an NT Service named the Automatic Processing Utility (APU) 118. When a guest checks in, the property management system will put an entry in the announcement table saying the account x checked into room y. The APU at a set interval (generally every 30 seconds) will instantiate an Announcement IKO object. This object checks the announcement table for any new activity. If it finds something to do, it instantiates an IKO object for each type of device at the relevant property and instructs each IKO object to send the proper check in message to each device. From this point on the communications are handled in much the same way as before.

That is, the IKO 108 packages the message in XML (120) and sends it via an HTTP post message to the XKO object 114b at the hotel site. The XKO 114b reads the XML and passes it to the IIC Client 106. The IIC Client figures out which device the message was intended for and sends it off to the SerialPort.OCX 104 which, in turn, wraps the message in the proper protocol and BCC type and sends it to the device 102. If there are any responses to the outgoing messages the IIC Client 106 packages them and sends them in the same manner as the IKO 108. The whole process takes on average less than 500 milliseconds depending on internet lag time.

Figure 2:
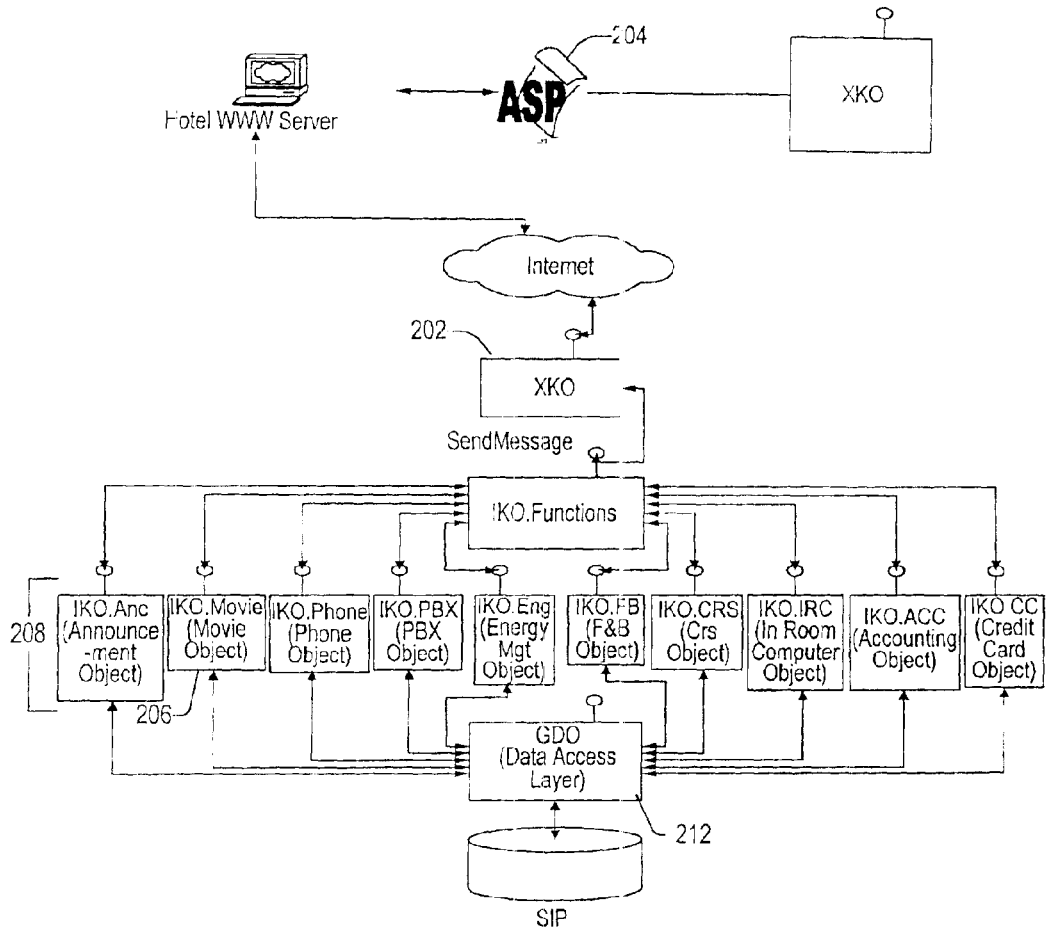
FIG. 2 is a diagram of the server side components and the way in which they interact according to a specific embodiment of the invention.

In the following section, details of each of the components of the IIC will be described according to a specific embodiment of the invention. First, the main IKO server side components and the manner in which they interact will be described with reference to FIG. 2.

The XKO Layer

The XKO Layer 202 is the internet communications layer. The objects that make up this layer handle all the incoming and outgoing message traffic from any source. A message can get to the XKO layer 202 via an HTTP post message on Microsoft's IIS Web Server. There is an Active Server Page (ASP) layer called XKO.ASP (204) that waits for a post message to be called and this ASP page 204 calls the XKO layer 202 and passes the post information to it. When the XKO layer 202 gets the post information, it pulls apart the XML package and then decides how to process it. A typical XML package may look like:

```
<?xml version='1.0'>
<intr xmlns=""Version="1.0">
    <Header OriginalBodyRequested="false" ImmediateResponseRequired="true">
        <FromURI>http://www.propertyurl.com/XKO</FromURI>
        <ToURI>http://www.igets.net/XKO</ToURI>
        <ReplyToURI>http://www.propertyurl.com/XKO</ReplyToURI>
        <MessageID>234567890-01</MessageID>
        <OriginalMessageID>234567890</OriginalMessageID>
        <TimeStamp>2000-07-16T10:45:12</TimeStamp>
        <Token>2234-567-8901</Token>
    </Header>
    <Body>
            <id>100001</id>
        <object>IKO.Movie</object>
        <method>InputMessage</method>
        <inputmessage>P00199991NIT</inputmessage>
    </Body>
</intr>
```

This message is broken down by the XKO into the following parts:

Header—This is a standard formatted HITIS (see *HITIS Standards Support in IIC* later in this document) header which is broken down into the following parts:

FromURI and ToURI elements are system addresses that identify the origin and destination of the message. The ReplyToURI is the address of the system that is expecting a response to this message. Typically this is the originating system.

Message Ids—A message ID is created by the originating system and is used to identify the original message. The Message ID defines the message set of a request and response pair. A message may be queued, asynchronous of the context of the message, and systems can use the MessageID to match up the result with the request. If the message needs to be re-posted, a Message ID is also used in the re-post. The OriginalMessageID is a means by which to identify the original message.

Token—A <Token> is a "cookie" that gives authorization to the system, or permission to send the message. The <Token> is originally returned by the server in response to the HITISRegister message.

Body

ID—this is the interface ID. This tells the IKO which property and interface for that property that this message was from.

Object—this is the object that the XKO is to call. In the above example the XML package is telling the XKO layer to pass the message along to the IKO.Movie object.

Method—this is the method call on the object that the XKO layer it to call.

InputMessage—this is the actual data that was received on the IIC Client side. This is the information that the IKO layer is to process.

HITIS is an acronym which stands for Hospitality Industry Technology Integration Standards and is an initiative, led by the American Hotel & Motel Association to create computer interfacing standards that will accelerate the hospitality industry's technology usage and lower automation costs. More information regarding HITIS can be found at www.hitis.org.

Based on the example XML package set forth above, the XKO layer 202 does the following. It verifies the token against the sending system and if it is an invalid token it discards the message. If everything is ok then it continues. It then creates an instance of the IKO.Movie object 206 and makes a function call that looks like this: IKO.Movie.InputMessage("P0019999INIT", "100001"). After the Function call is made it waits for the response from the IKO layer 208, packages it in XML, puts it in the HTTP response buffer (not shown), and tells the web server that the page response is complete. The objects of the XKO layer 202 also have functionality for accepting and printing reports from remote sources which will be explained later in the reporting section.

The IKO Layer

The IKO layer 208 is the set of objects that are devoted to the business logic. They handle all the information processing and interact with the GDO layer 212. Based on XML package described above, the IKO layer 208 does the following: The function IKO.Movie.InputMessage is called by the XKO layer. This is the public interface to the IKO Movie object 206. Each IKO object has a corresponding exposed method. When the method is called, the IKO layer 208 goes out and asks the GDO layer 212 for information about the interface. That is, it gets the property name, interface device type, the individual configuration for the interface for that property, and any other information it needs to process the message. Thus, for the XML package in this example it would get the configuration for interface id #100001.

The IKO layer 208 then calls a function that parses the message ("P0019999INIT"). This is a message from a Lodgenet Movie system which is parsed into the follow parts:

1) "P" this indicates that it is an originating message
2) "001" this is message #1 in it's sequence
3) "9999" there are no more message in this sequence to be sent
4) "INIT" this is a request for a full room resynchronization The IKO layer 208 then calls the IKO.Movie.msgINIT function and a "S0019999VER" message is sent back to the XKO layer 202 indicating that the message was received properly. That message is sent back to the movie device. All additional messages are new HTTP post messages to the property's web server.

The msg.INIT function then goes out and asks the GDO layer 212 for all the rooms in the database for the relevant property and whether or not they are occupied. If a room is not occupied then a checkout message is sent for that room. If, on the other hand, a room is occupied then the IKO layer 208 asks the GDO layer 212 who is in the room and if the person is allowed to post. A check-in message is sent for each of those rooms and if necessary a No Post message is also sent. When the message is finished processing the IKO object unloads everything and itself.

The GDO Layer

This is the data access layer. The XKO layer 202 and the IKO layer 208 are "agnostic" regarding the database(s) to which they are connecting. They only know about the existence of the GDO layer 212 (and its objects) and the method calls that are available. The GDO layer 212 contains all the knowledge regarding how to connect to and talk to the various supported databases, e.g., all of the SQL for this purpose. In the example above the IKO layer 208 requests information regarding all of the rooms in the hotel and whether they are occupied. That is, the IKO layer 208 makes the method call:

GDO.z_rooms.GetRoomList("P12345"). In response, the GDO layer 212 connects to the database(s) 212 and makes the following SQL call:

SELECT property, code FROM z_property_room WHERE property='P12345' ORDER BY code ASC The GDO layer 212 then returns the appropriate record set to the IKO layer 208.

Figure 3A:
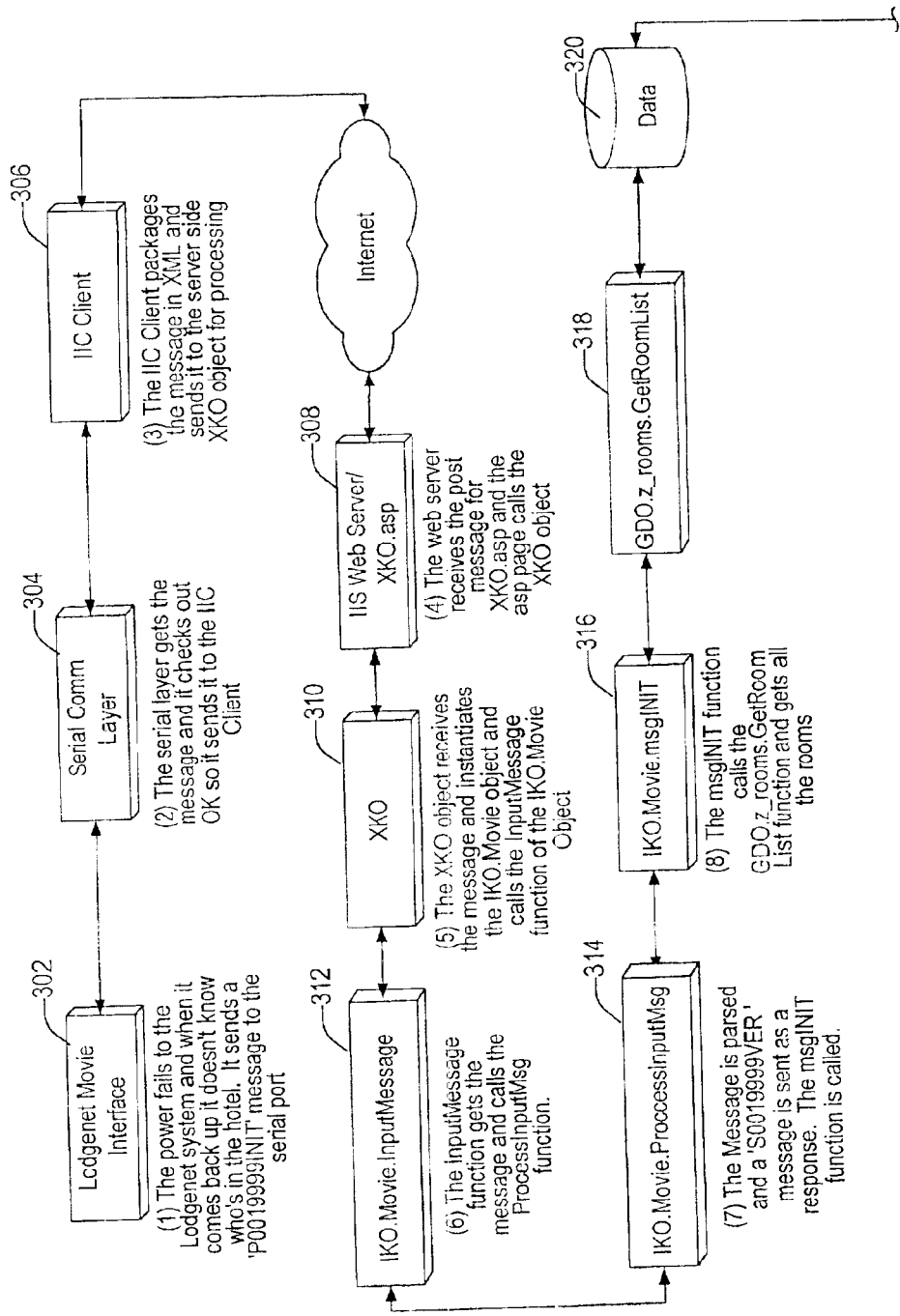
FIGS. 3A and 3B are an information flow diagram illustrating processing of a message according to a specific embodiment of the invention.
Figure 3B:
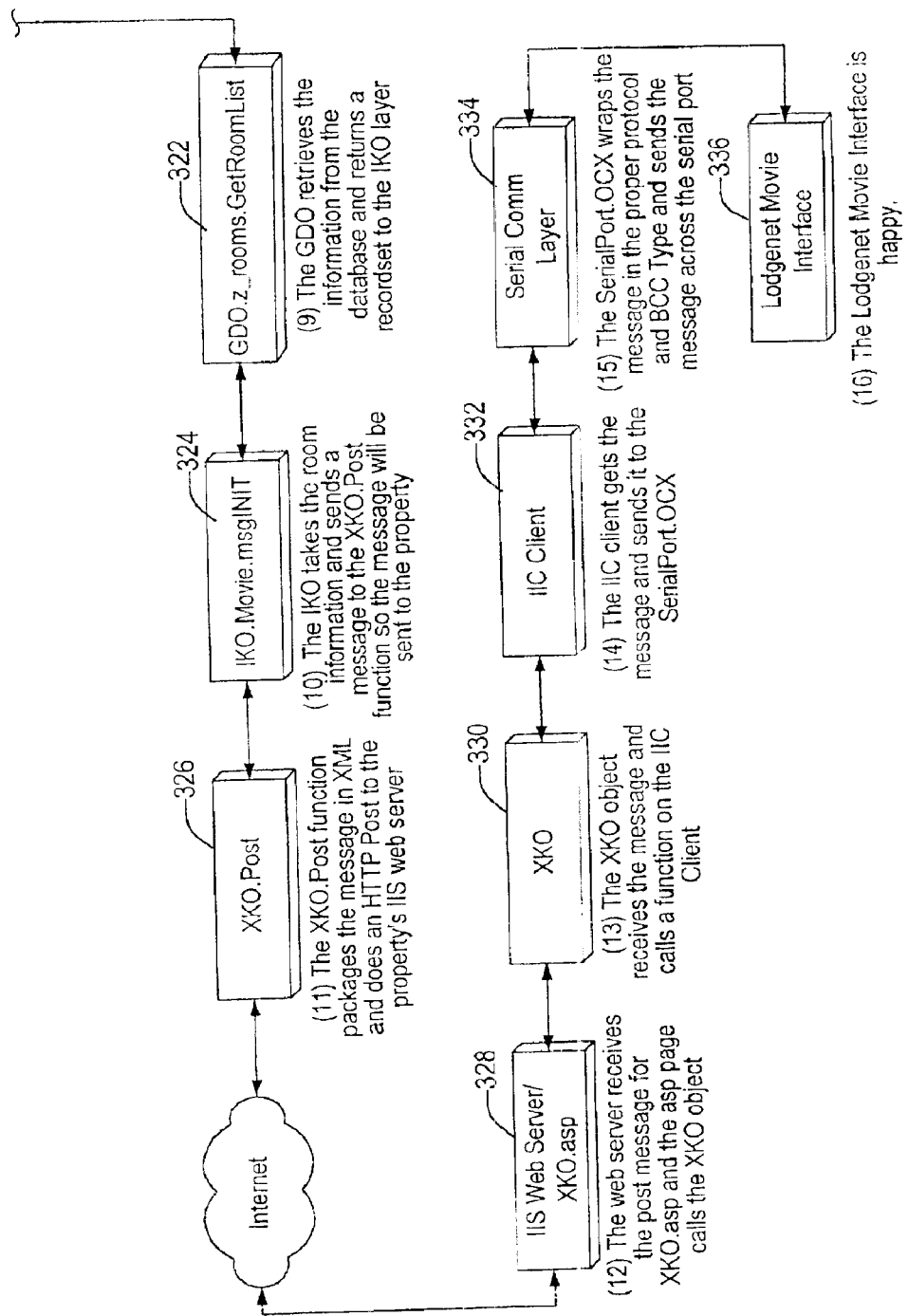

A flow diagram of a message being processed according to a specific embodiment of the invention is shown in FIGS. 3A and 3B. The example depicted occurs when power fails to a serial device (e.g., the movie system) at a hotel property and must be reinitialized. After power is brought back up, the serial device sends an initialization message (e.g., P0019999INIT) to the serial port requesting information regarding which rooms are currently occupied (302). The client side serial layer receives the message and, if it is authentic and properly formatted, sends it to the IIC Client (304). The IIC Client packages the message in XML and sends it to the system server side XKO layer for processing (306).

The system server receives the XML message for the XKO layer, the appropriate XKO object being called by the ASP page (308). The XKO object receives the XML message and instantiates the appropriate IKO object, in this case the IKO.Movie object, and calls the InputMessage function of the IKO.Movie object (310). The InputMessage function in turn calls the ProcessInputMsg function (312) which parses the message, sends a responsive S0019999VER message, and calls the msgINIT function (314). The msgINIT function calls the GDO.z_rooms.GetRoomList function (316) which requests (318) data for all the rooms at the hotel property from database 320. The GDO layer receives the requested information and returns the record set to the IKO layer (322).

The msgINIT function of the IKO layer receives the room information record set from the GDO layer and sends a message to the XKO.Post function of the XKO layer for forwarding to the corresponding hotel property (324). The XKO.Post function packages the message in XML and does an HTTP post to the relevant hotel property's IIS web server (326). The hotel's web server receives the post message for the XKO.asp function and the ASP page calls the relevant XKO object of the XKO layer at the property (328). The instantiated XKO object receives the message and calls a corresponding function on the IIC Client (330) which receives the message and forwards it to the Serial Communication Layer (332). The SerialPort.OCX function of the Serial Communications Layer wraps the message in the proper protocol and BCC type (in this case corresponding to the hotel's movie system) and sends the message across the serial port (334). The message is received by the appropriate serial device, e.g., the movie system, which takes appropriate action, e.g., configures the rooms according to the room information received in the message (336).

Figure 4:
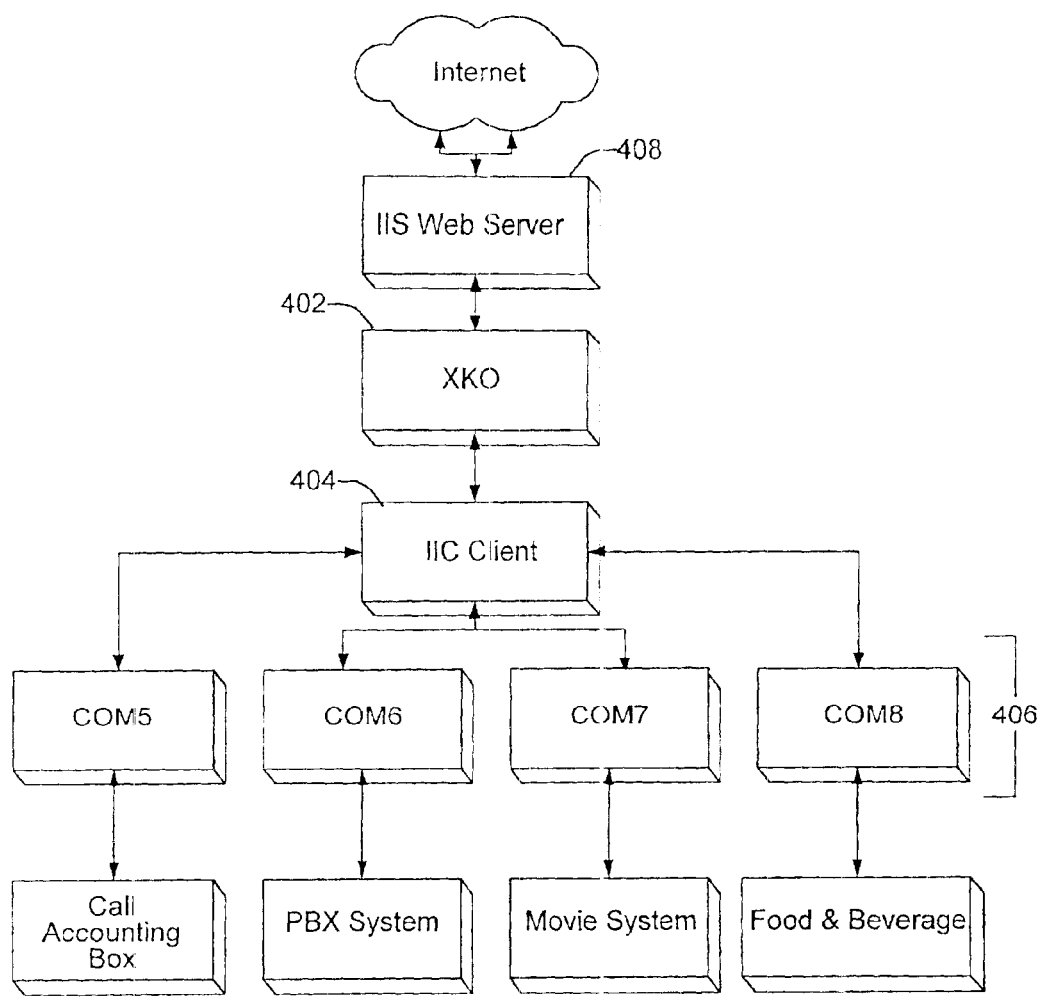
FIG. 4 is a diagram of client side devices and their interaction with the client side components according to a specific embodiment of the present invention.

According a specific embodiment and as shown in FIG. 4, the client side of the system includes an XKO layer 402 set-up similarly to the server's XKO layer, an NT Service known as the IIC Client 404 and the SerialPort.OCX control layer 406. When a message comes into the property it is accepted by the property's IIS Web server 408 and is passed to the XKO 402 by the XKO.asp page (not shown). The XKO layer 402 then passes the message to the IIC Client 404 which routes the message to the proper serial device (devices 410) using the SerialPort.OCX control layer 406.

The IIC Client

According to various embodiments, the IIC Client (e.g., layer 404 of FIG. 4) is an NT Service the opens up a connection to the serial communications layer for each device that is running at a hotel property. The IIC Client can also monitor for incoming Central Reservation System (CRS) files as well as connections on specified TCP/IP ports. When data comes in the IIC will package it up in XML and send it as an HTTP post to the IKO's web server.

The IIC Client has no knowledge of the interfaces that are running at the property or what COM ports it is supposed to be monitoring. The IKO layer sends the information in the form of a polling message every 5–10 minutes. If for any reason the IIC Client has gone down or if the machine that it is running on has been rebooted, the polling message will refresh the information it needs in order to open up the serial ports and resume sending information. If information comes from the IKO layer before a polling message reaches the IIC Client and it does not know what it's configuration is, it sends a request message and the IKO layer and the IKO layer responds with the configuration information. According to a specific embodiment, the polling message appears as follows:

```
<?xml version='1.0'>
<intr xmlns=""Version="1.0"">
    <Header OriginalBodyRequested="false" ImmediateResponseRequired="true">
        <FromURI>http://www.igets.net/XKO</FromURI>
        <ToURI>http://www.propertyurl.com/XKO</ToURI>
        <ReplyToURI>http://www.igets.net/XKO</ReplyToURI>
        <MessageID>234567890-01</MessageID>
        <OriginalMessageID>234567890</OriginalMessageID>
        <TimeStamp>2000-07-16T10:45:12</TimeStamp>
        <Token>1234-567-8901</Token>
    </Header>
    <Body>
        <object>IIC_Client.Comm<object>
        <method>poll</method>
        <id>100001</id>
        <responseobject>IKO.Movie</responseobject>
        <responseurl>http : //www.igets.net/XKO/XKO.asp</responseurl>
        <commport >5</commport>
        <baudrate>2400</baudrate>
        <bytesize>8</bytesize>
        <parity>N</parity>
        <stopbits>1</stopbits>
        <bcctype>1</bcctype>
        <protocol >1</protocol>
        <timeout>500</timeout>
        <attempts>3</attempts>
        <sendresptime>500</sendresptime>
        <waitresptime>500</waitresptime>
        <enquire>ENQ<enquire>
        <enquireresp>ACK</enquireresp>
        <positiveresp>ACK</positiveresp>
        <negativeresp>NAK</negativeresp>
        <header>STX</header>
        <terminator>ETX</terminator>
        <description>Property P12345,Movie Intertace.Com 5</description>
    <Body>
</intr>
```

The IIC Client responds to each of the polling messages in the response buffer of the HTTP post. If the IKO layer sends out 3 consecutive polling messages and gets no response from the IIC Client, the IKO layer assumes the IIC Client is down, notifies support and sends an e-mail to the property.

The IIC Client also accepts "Initialize" and "Terminate" messages from the IKO layer. The Initialize message is identical to the polling message, except that it explicitly tells the IIC Client to start a device interface back up after a Terminate message has been sent to it. A Terminate message is sent to the IIC Client from the IKO layer after a request from the user has been sent saying to shut down a particular interface. The IIC Client closes that com port and ceases sending any more information to it. The IIC Client will not open the serial port back up until either an Initialize message has been sent to it or the IIC Client has been rebooted.

The Serial Communications Layer

According to a specific embodiment, the Serial Communications layer (e.g., layer 406 of FIG. 4) is an ActiveX control written in C++ that is opened and controlled by the IIC Client. This component handles all the serial communications with the external devices. It is highly configurable. It has been written to deal with the many different protocols and BCC (block check character) types that exist. According to a specific embodiment, it supports 3 different protocols and 13 different BCC types including. Examples of such protocols include simply sending messages with the appropriate BCC type; sending such messages and waiting for corresponding acknowledgement messages from the remote devices; and sending an inquiry message, receiving a positive acknowledgement from the remote device, sending the message with the BCC type, and again waiting for positive or negative acknowledgement from the remote device. Everything is configurable from the time it waits for a response to the characters it uses in the protocols to the corn port it is opening. It is basically a generic corn layer that will work with virtually any device that exists today.

When the Serial Communications layer receives a message from the IIC Client it takes the message puts the proper BCC type on it and sends it with the proper protocol to the external device. When it receives a message from the external device it checks the BCC type and the protocol. If it fails either of these, it rejects the message and raises and error event in the IIC Client. If it passes, then it raises a new message event in the IIC Client and passes it the serial message.

Central Reservation Systems

Figure 5:
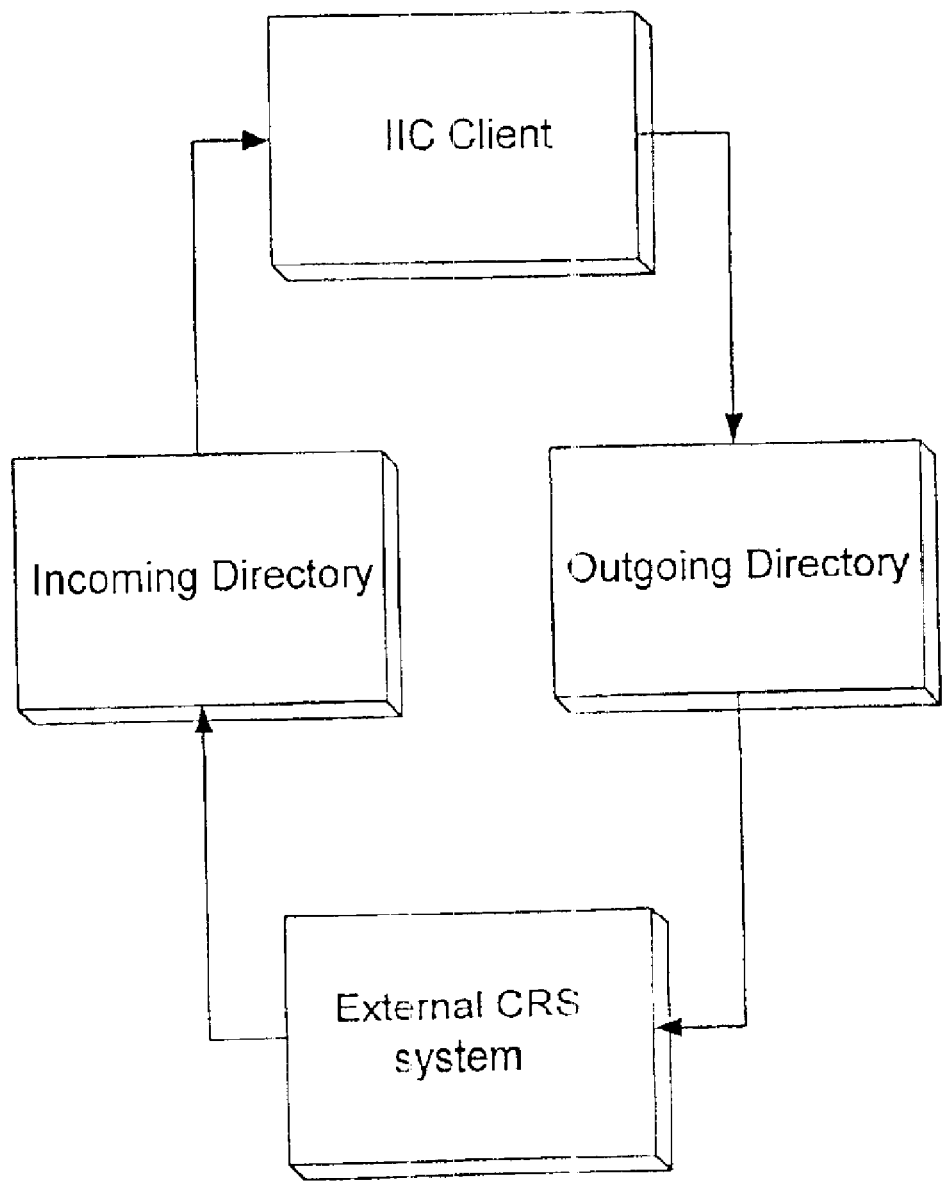
FIG. 5 is a diagram of communication between client side components and a central reservation system according to a specific embodiment of the invention.

Issues specific to a hotel property management implementation will now be described with reference to FIG. 5. That is, the manner in which the system of the present invention interacts with a central reservation system (CRS) will be discussed.

Talking to an external Central Reservation System at the property level works in a similar manner to the serial devices. One difference is that the IIC Client monitors a serial port or a directory waiting for files to come in. When a serial message or file comes in, the IIC Client takes the entire file, converts it to an XML document and then sends it to the IKO layer for processing.

For two-way CRS systems, information is sent to the IIC Client in much the same way as with the serial interfaces, a difference being that an entire XML encoded file is sent and the IIC Client writes the file to a specified directory (or sends it to a serial port) for processing by the external CRS system. A high level representation of this interaction is represented by the block diagram of FIG. 5.

According to a specific embodiment, the IIC supports the direct integration of external central reservation systems with the database(s) to which the IIC provides access by supporting the HITIS Central Reservation Standards. The XKO layer associated with the IIC accepts the HITIS messages and responds with HITIS standard messages. For example, if a $3^{rd}$ party CRS wanted to query the database(s) for availability and book a reservation for a particular property that has a property ID of P12345, according to a specific embodiment of the invention, the following would take place:

1) The $3^{rd}$ party CRS sends a HITIS Register message and is assigned a token by the IIC.

2) The $3^{rd}$ party then sends a HITIS message such as, for example, a HotelSearchQueryRequest (see the attached Appendix for other examples of HITIS messages) message to the XKO layer if it wants to verify that the property exists in the database. If the property does exist, the XKO layer sends back a HotelSearchQueryResponse message with content indicating that the hotel exists. If the hotel does not exist, the HotelSearchQueryResponse message contains an error code indicating that the hotel does not exist in the database.

3) If the hotel exists in the database, the $3^{rd}$ party sends an AvailabilityQueryRequest message to get specific availability for property P12345. The XKO layer then sends back an AvailbilityQueryReponse message with rates, descriptions, available dates, etc. If this information is adequate for the $3^{rd}$ party system, then a booking can be made.

4) Most systems require another query to get product specifics. Thus, according to a specific embodiment, after picking one or two items from the AvailabilityQueryResponse message, the $3^{rd}$ party system sends another AvailabilityQueryRequest message and asks for more detailed information about the selected items. The XKO layer then sends back another AvailabilityQueryResponse message with the detailed information.

5) After the $3^{rd}$ party system has all the information it needs to book the reservation a ReservationBookingRequest message is sent. According to one embodiment, there is no state maintained between the availability query and the reservation request. When the availability query is made the response back is informational only, and provides a snapshot at the time that the request is made. Thus, according to such an embodiment, it cannot be assumed from the return that a booking request will be approved based on that information. The reservation request is an atomic request that can either be approved or denied depending on the status and whatever other reasons that the hotel chain or the hotel itself might have for declining the request.

6) If the reservation request is accepted a ReservationRequestResponse message is sent back to the $3^{rd}$ party containing a ConfirmationID and a ReservationID.

As will be understood, this is only an example of how a $3^{rd}$ party CRS system might interact with the IIC and the associated database(s). As mentioned above, the IIC supports the full HITIS Standards specifications which can be found at www.hitis.org.

Credit Cards

Figure 6:
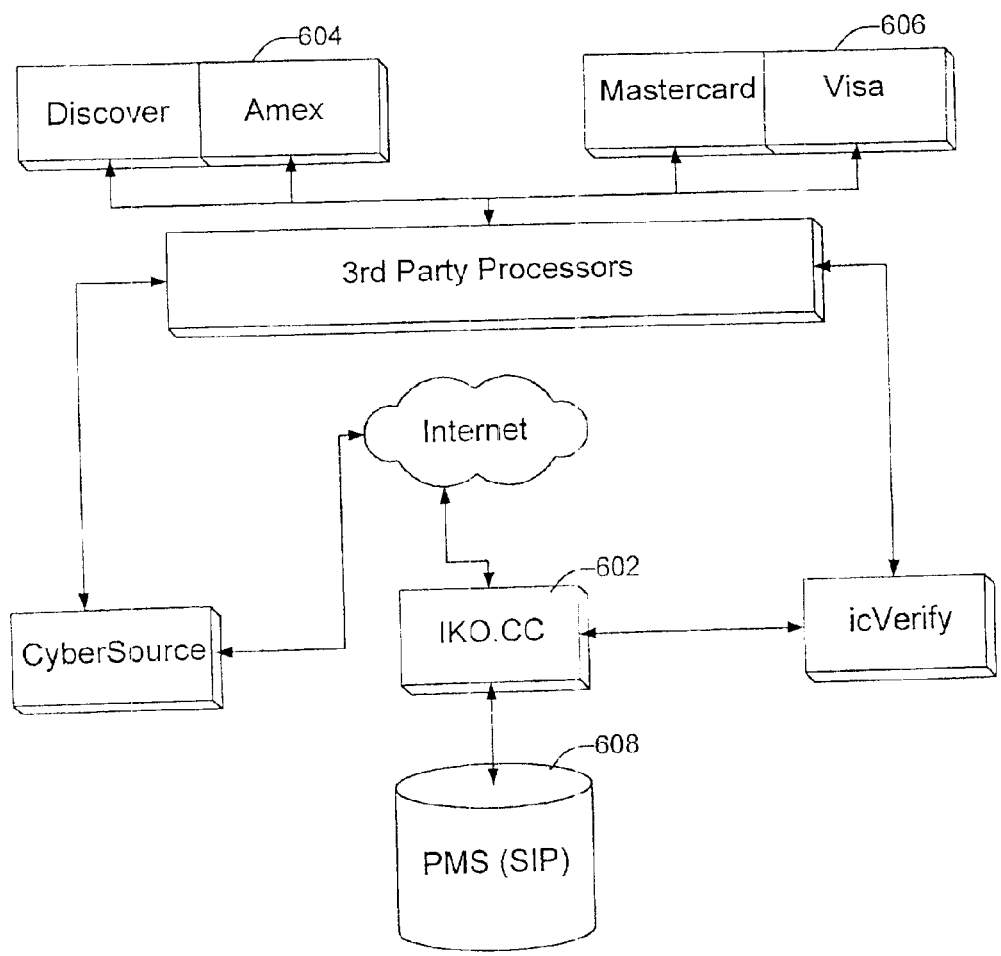
FIG. 6 is a diagram of property management system designed according to the present invention interacting with credit card processors.

According to a specific embodiment of the present invention, a Credit Card system interface is provided which acts in a different manner than the other described interfaces. As will become clear, with this interface it is not necessary to interact with the property directly. According to one embodiment, all communication goes between the Property Management System (PMS), the associated IKO layer and the Credit Card Processor. An information flow diagram representing a credit card authorization process according to one embodiment of the invention is shown in FIG. 6.

The Credit Card object (602) of the IKO layer (IKO.CC) is designed to work with multiple credit card processing systems. Two such credit card systems 604 and 606 are shown in FIG. 6 for simplicity. When, for example, a guest checks into the hotel, the PMS 608 makes a call to the IKO.CC object 602 and asks for a credit card authorization for an amount, let's say $250.00. The IKO.CC 602 checks with the PMS 608 to see which credit card processing system the hotel is using and makes a secure connection to that processing system. The credit card processing system then talks to the issuing bank (customer's bank) and requests an authorization. The credit card processor then returns an approval or denial to the IKO.CC object. The IKO.CC object then tells the PMS that it is approved or denied.

According to various embodiments, account settlement works much the same way. According to a specific embodiment, the hotel picks a group of cards to be settled and tells the PMS that they want to settle them. The PMS makes a call to the IKO.CC object and tells it to settle batch #500123 (or whatever the batch # happens to be). The IKO.CC object then makes a call to the GDO layer (e.g., see FIG. 2) and gets a list of the cards to be settled. The IKO.CC object then does a final authorization for each of the cards. Once the authorizations are finished, the IKO.CC issues a settlement for those cards. If the credit card processor comes back with and says that the settlement was successful the IKO.CC object calls the GDO layer and sets the batch as sent. If anything other than a success message is returned from the credit card processor then the IKO.CC object makes a call to the GDO layer and marks the batch as unsuccessful.

According to various embodiments, the IKO.CC object may also be utilized by a $3^{rd}$ party for credit card authorizations and settlements. According to one such embodiment, the IKO.CC object (via the XKO layer) exposes two method calls "Authorize" and "Settle". These both operate in much the same way that the IKO layer talks to the IIC Client application. That is, an XML HTTP Post is sent to the IKO layer and the XKO layer brokers the call and returns a response in XML. A typical XML authorization request might look as follows:

```
<?xml version='1.0'>
<intr xmlns=""Version="1.0">
    <Header OriginalBodyRequested="false" ImmediateResponseRequired="true">
        <FromURI>http://www.propertyurl.com/XKO</FromURI>
        <ToURI>http://www.igets.net/XKO</ToURI>
        <ReplyToURI>http: //www.propertyurl.com/XKO</ReplyToURI>
        <MessageID>234567890-01</MessageID>
        <OriginalMessageID>234567890</OriginalMessageID>
        <TimeStamp>2000-07-16T10:45:12</TimeStamp>
        <Token>1234-567-8901</Token>
    </Header>
    <Body>
        <cc>
            <id>200001<id>
                <security>23xx4093a</ security>
                <object>IKO.CC</object>
                <method>Authorize</method>
                <auth_type >New</auth_type>
                <credit_card_type>MC</credit_card_type>
                <credit_card_number>1234567890123</credit_card_number>
                <credit_card_expiration>10/02</credit_card_expiration>
                <name_on_card>John Doe</name_on_card>
                <authorization_amt>250.00</authorization_amt>
        </cc>
    </Body>
</intr>
```

A typical XML settlement request might look as follows:

```
<?xml version='1.0'>
<intr xmlns=""Version="1.0">
<Header OriginalBodyRequested="false" ImmediateResponseRequired="true">
    <FromURI>http://www.propertyurl.com/XKO</FromURI>
    <ToURI>http://www.igets.net/XKO</ToURI>
    <ReplyToURI>http://www.propertyurl.com/XKO</ReplyToURI>
    <MessageID>234567890-01</MessageID>
    <OriginalMessageID>234567890</OriginalMessageID>
    <TimeStamp>2000-07-16T10:45:12</TimeStamp>
    <Token>1234-567-8901</Token>
</Header>
<Body>
    <cc>
        <id>200001</id>
        <object>IKO.CC</object>
        <method>Settle</method>
```

-continued

```
    <card info>
      <credit_card_type>MC</credit_card_type>
      <credit_card_number>12345678790123</credit_card_number>
      <credit_card_expiration>01/02</credit_card_expiration>
      <name_on_card>John Doe</name_on_card>
      <settlement_amount>250.00</settlement_amount>
    </card_info>
    <card info>
      <credit_card_type>AX</credit_card_type>
      <credit_card_number>12345678790123456</credit_card_number>
      <credit_card_expiration>07/01</credit_card_expiration>
      <name_on_card>Jane Doe</name_on_card>
      <settlement_amount>992.55</settlement_amount>
    </card_info>
  </Body>
</intr>
```

Reporting

With the XKO layer and a utility referred to herein as the Automatic Processing Utility (APU), batch reporting to any of a variety of locations is facilitated. With the APU a property can specify, for example, that they want report formats 1, 2 & 3 everyday at 3:30pm printed to the printer at the front desk. The APU scans through it's list of things to do and at 3:30pm runs report 1, 2 & 3 for the property as specified. The APU then takes the results of the reports (reporting is done in XML with XSL style sheets), packages them as an XML document, and sends them to the property's XKO layer. The XKO layer takes the reports, loads them into a web browser, connects with the specified printer, and prints the reports.

Monitoring

According to various embodiments, interface activity can be monitored at anytime by, for example, a particular property, viewing its own interfaces; by a property management system of a chain of properties, viewing all the interfaces for a single property or the entire chain; or by system support personnel, viewing all the interfaces running in the system, an entire chain, or a single property. The relevant user simply logs into a web interface associated with the system, selects the appropriate interface module, and receives a list of currently running interfaces and information regarding the time of the last transmission for each interface. According to a specific embodiment, with the proper security (i.e. support) the user is able to see the raw XML messages that were being sent back and forth as well as the raw serial data.

In a specific embodiment, interfaces are also monitored by the system in the form of alerts that are raised based on business rules. Interface alerts are handled on two levels, alerts going to internal support and alerts going to the property.

Alerts going to the support department are fixed and cannot be changed. There are different rules for different kinds of interfaces and their expected volume of messages. For example a PBX interface that sends a polling message every 30 seconds. The rules for this interface would expect a message coming from that device every 30 seconds. If 5 minutes go by and there are no messages, the IIC raises an error to support saying that it has not heard from the PBX in the last few minutes. On the other hand if there was a 75 room property running a call accounting interface and that property was running at only 40% occupancy then the IIC might not raise an error unless a 12–24 hour period had gone by without a message coming from the property.

Other types of message based alerts may relate, for example, to a movie interface which keeps sending posting messages for a room that doesn't exist. In such a case, the IIC notifies support so they can call the property and let them know about the problem and get it fixed. Another example is where a Food and Beverage device starts sending garbage instead of valid messages. In such a case, an alert is raised so the problem may be investigated.

Another possibility for an alert relates to losing communications with a property entirely. For example if an IIC Client at property P12345 doesn't respond to 3 polling messages in a row, then the support department is sent an email notifying them of the failed communication with property P12345. If the problem persists for 30–60 minutes then a page is sent to designated support people. After that the IIC starts to send network messages as well as email messages to $3^{rd}$ level support personnel.

Property level alerts work in a similar fashion to the support alert except they are much more configurable. A property may not want to be notified every time a couple polling messages are missed. So, via a web interface the property staff can set Alert thresholds. For example, an authorized user might specify that he wishes to receive an email to user@property.com when the property's IIC Client hasn't sent a message for 3 hours. An authorized user could also specify that they wish to know immediately by alpha numeric pager whenever no response is received to a polling message.

Authorized personnel at the property level also have the ability to go in and run a report which details the total number of transactions that occurred per interface on a hourly, daily, weekly, etc., basis. Such information may be configured, for example, to include the types of transactions, how many errors occurred, and the number of lost transactions.

IIC Relationship to HITIS Standards

According to specific embodiments relating to the hospitality industry, the design of the IIC adheres to the HITIS XML based messaging standards. Thus, the IIC designed according to such embodiments can respond to all of the HITIS messages as defined on the HITIS web site (www.hitis.org). In the instances where HITIS has not defined a standard (e.g., communications between the IIC Client and the IIC), the design of specific embodiments of the present invention has adhered to the HITIS message format for other messages (i.e., the same header/body format). Thus, in the event that HITIS does provide a standard for that type of message, the messaging format of the present invention will be readily adaptable to the new HITIS standard message. This also facilitates use of these messages by $3^{rd}$ parties provided that they already support other HITIS messages.

Another advantage of adhering to the HITIS standard is that once a 3$^{rd}$ party has written a HITIS compliant interface that is interacting with another system, or if a system designed according to the present invention needs to communicate with another system that is already speaking the HITIS language, there is little or no additional work to be done, i.e., the 3$^{rd}$ party system can already communicate with the IIC.

Architecture

According to a specific embodiment, the IIC Architecture is based on a mix of internet standard protocols and Microsoft programming/design standards. All of the objects are written in Microsoft Visual Basic and the NT Services are written in Microsoft Visual C++. The objects are written with a strict adherence to Microsoft's guidelines for writing MTS/COM+ objects.

The Interface system is built on the Microsoft Windows 2000 platform and utilizes many of it's new or expanded features. All of the objects that do data processing and database access are Windows 2000 COM+ Objects. All data access is done through the use of Microsoft's ADO layer. All data access from external (i.e. internet) devices is done through Microsoft's IIS 5.0 Web Server.

According to a more specific embodiment, the communication is done strictly in XML. This was done so that many disparate devices could communicate with the IIC and wouldn't have to write to a proprietary standard. Because XML is used, the public interfaces of the present invention may be published and used by anyone. This approach facilitates use by 3$^{rd}$ parties of, for example, the credit card interface of the invention (see the discussion above regarding external credit card calls). This architecture also opens the door for a PMS vendor to use the interface services described herein by writing some simple XML to integrate their PMS with the system of the present invention (see the descriptions of Datastore Anywhere and DataStore Anyone later in this document).

According to some embodiments, the XML packages of the present invention are left fairly generic with simple DTD's describing them. This was done to accommodate the many different XML messaging standards that are emerging. That is, in order to support whichever standard eventually presents itself as the most widely used, the XML was left generic and simple. According to one embodiment, however, the SOAP (Simple Object Access Protocol) is the supported messaging standard. The SOAP is supported by an increasing number of major companies and is being integrated into the next suite of Microsoft development products, and may be the de facto standard for internet based object access protocols.

Figure 7:
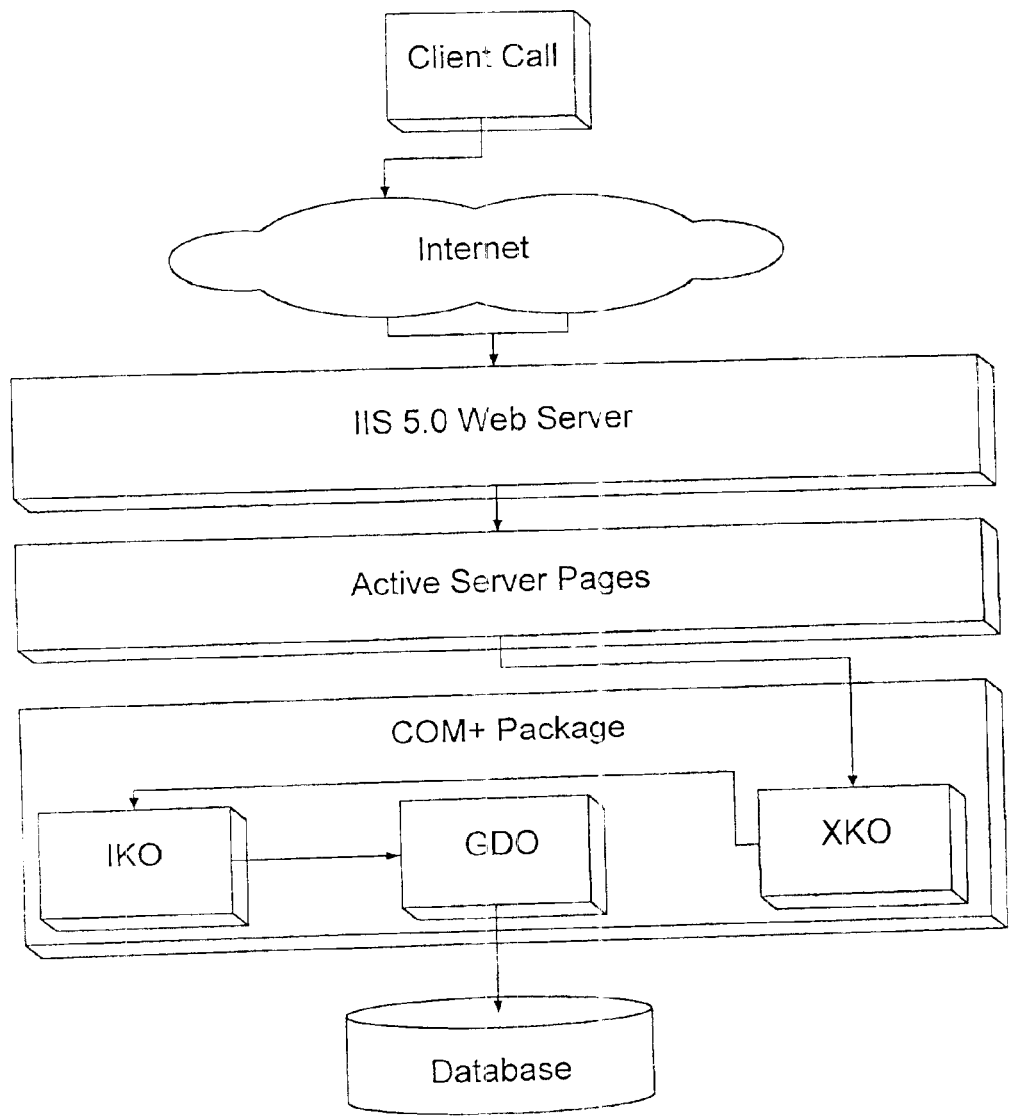
FIG. 7 is a diagram illustrating a generalized embodiment of the present invention.

An overview of a specific embodiment of the present invention is shown in FIG. 7 which illustrates the elements in a call out to the internet.

Datastore Anywhere

Figure 8:
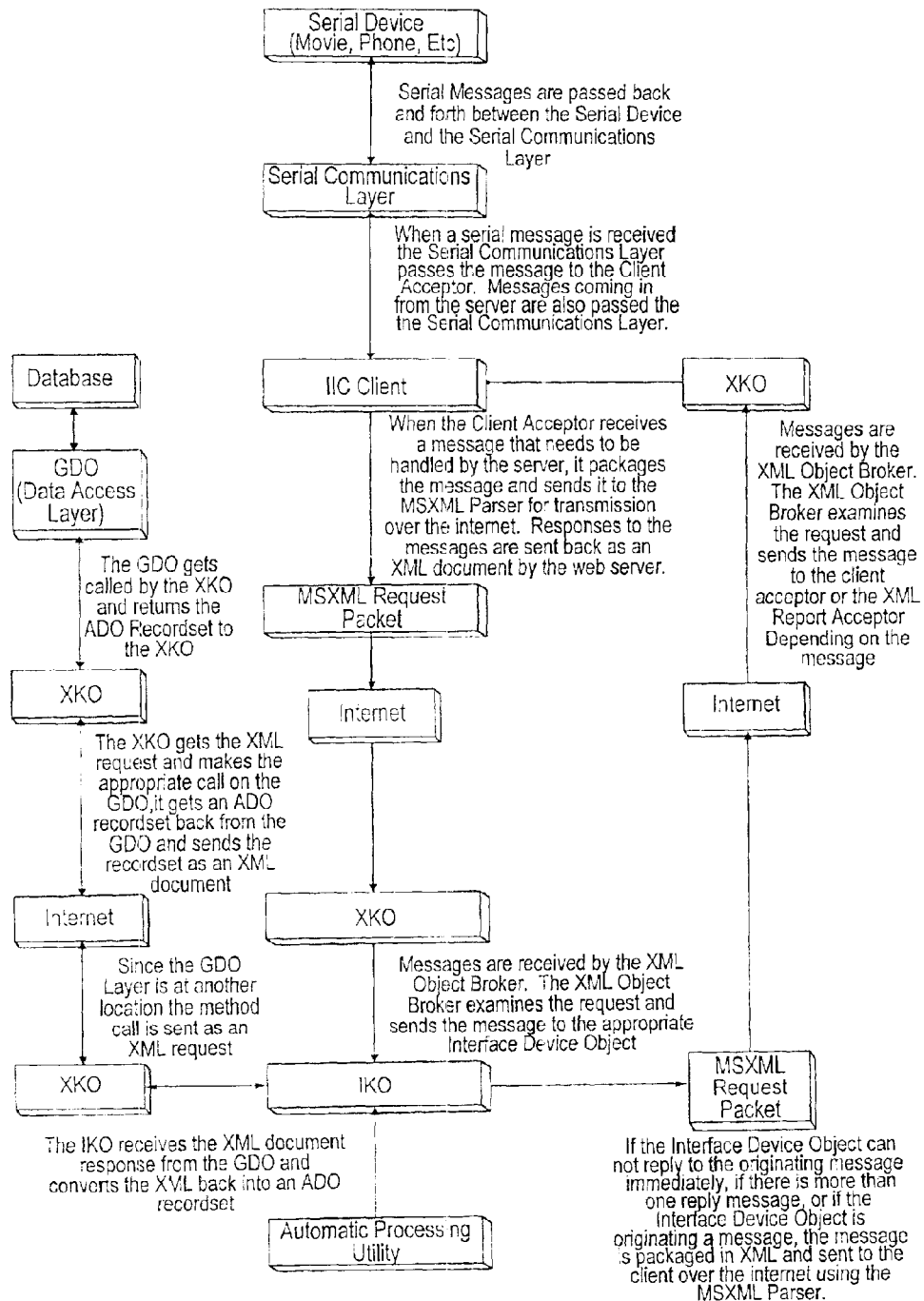
FIG. 8 is a diagram illustrating operation of a specific embodiment in which the database is not co-located with the server side components.

Datastore Anywhere describes an embodiment of the present invention in which the IIC is not at the same location as the database(s). This changes how the IIC layers, i.e., the IKO and XKO layers, talk to the database(s). According to this embodiment, the database(s) and GDO layer are at an entirely different location. Thus, the IKO layer communicates with the GDO layer via XML. An overview of the communication is shown in FIG. 8. According to this embodiment, an XKO Layer and the IIC Client reside at the hotel property, another XKO and the IKO layer reside at the site that is processing the interface information, and yet another XKO layer and the GDO layer reside at the site that is doing the database processing.

This configuration may be useful, for example, where a property wants to have their data residing at their location, but still wants the benefits of a centralized interface processor. In such an implementation, the data may be kept at the property where an XKO layer, the IIC Client, and a GDO layer would also be installed. The IIC Client operates as described above, sending information to the IKO layer of the IIC for processing. The IKO layer of the IIC queries back to the property for any needed information which is retrieved via the property's GDO layer. The IKO layer of the IIC then sends the appropriate messages back to the IIC Client which are then sent out over the serial ports to the attached devices. A typical GDO XML call is as follows:

```
<gdo>
        <id>300001</id>
        <security>21332sds3</security>
        <object>GDO.z_rooms</object>
        <method>GetRoomList</object>
        <property>P12345<property>
</gdo>
```

A typical response to such a call appears as follows:

```
<gdo>
        <recordset>
                <record property="P12345" code="101" />
                <record property="P12345" code="102" />
                <record property="P12345" code="103" />
                <record property="P12345" code="104" />
        </recordset>
</gdo>
```

Datastore Anyone

Datastore Anyone describes an embodiment of the present invention which works in a manner similar to the Datastore Anywhere, except that there is no GDO layer. More specifically the GDO layer is replaced by an XML standard to which any PMS vendor can write. For example, suppose that a new Property Management System comes on the market called PMS X having few or no interfaces. By obtaining a copy of the XML data access information and supporting the XML packages of the present invention, PMS X can quickly have a library of over 400 interfaces. What the maker PMS X will be doing is accepting the current system's XML requests for data (see the GDO XML call above), querying their database for the needed data, and responding with a well formed XML document (see the response to the GDO XML call above). For proper operation, knowledge of the configuration on the PMS X's side is unnecessary. All PMS X need do is accept an HTTP Post from the IKO layer of the IIC and put the response XML in the HTTP Response buffer. PMS X could be running Linux and using flat files for their database, or it could be running Solaris and using Oracle. Either way the IKO layer of the IIC wouldn't care.

While the invention has been particularly shown and described with reference to specific embodiments thereof, it will be understood by those skilled in the art that changes in the form and details of the disclosed embodiments may be made without departing from the spirit or scope of the invention. That is, although specific embodiments of the invention have been described herein with reference to the hospitality industry, it will be understood that the general principles of the present invention may be applied in any industry or setting to facilitate the remote management of disparate devices and systems. For example, a retail chain could centrally manage multiple retail locations from one or more centralized locations. Therefore, the scope of the invention should be determined with reference to the appended claims.

What is claimed is:

1. An interface controller for managing operation of a plurality of devices at two or more properties via a wide area network, each of the devices belonging to one or more of a plurality of classes and having a unique communication protocol associated therewith, the interface controller comprising:
   a network communications layer for communicating with the plurality of devices via the wide area network and a client application associated with the plurality of devices;
   an information processing layer for communicating with the network communications layer, the information processing layer having a set of objects corresponding to each of the plurality of devices, the information processing layer also being for interacting with a data access layer on behalf of each of the plurality of devices using the corresponding objects, interaction between the information processing layer and the data access layer on behalf of each of the plurality of devices using the corresponding objects, interaction between the information processing layer and the data access layer on behalf of all of the plurality of devices being governed by a single set of rules; and
   a property monitoring system coupled to the information processing layer, the property monitoring system generating a display that can include a user-selectable combination of device class and property.

2. The interface controller of claim 1 wherein the network communications layer is configured to communicate with the client application using eXtensible Mark-up Language (XML) and the TCP/IP protocol.

3. The interface controller of claim 2 wherein the network communications layer is further configured to communicate with the client application using HTTP posts.

4. The interface controller of claim 3 wherein an active server page layer is associated with the network communications layer for instantiating one of a plurality of network communications objects associated with the network communication layer in response to one of the HTTP posts from the client application.

5. The interface controller of claim 1 wherein the network communications layer is configured to instantiate selected ones of the objects associated with the information processing layer in response to messages from the client application.

6. The interface controller of claim 1 wherein each of the objects corresponding to each of the plurality of devices corresponds to a function to be performed by the information processing layer on behalf of the corresponding device.

7. The interface controller of claim 6 wherein selected ones of the functions correspond to retrieval of information from a database by the information processing layer via the data access layer.

8. The interface controller of claim 6 wherein selected ones of the functions correspond to communication with the corresponding device by the information processing layer via the network communications layer, the wide area network, and the client application.

9. The interface controller of claim 8 further comprising a processing utility which instructs the information processing layer to communicate with the corresponding device in response to notification from an external system.

10. The interface controller of claim 1 further comprising the data access layer which is collocated with the network communications layer and the information processing layer, and which facilitates interaction between the information processing layer and at least one associated database.

11. The interface controller of claim 10 wherein the at least one associated database comprises a SQL database, the data access layer being configured to communicate with the SQL database.

12. The interface controller of claim 10 wherein the at least one database comprises a plurality of databases each having its own unique format, the data access layer being configured to communicate with each of the databases according to the corresponding format.

13. The interface controller of claim 1 wherein the information processing layer is configured to communicate with the data access layer and interact with at least one database associated therewith via the network communications layer and the wide area network.

14. The interface controller of claim 13 wherein the single set of rules corresponds to the information processing layer.

15. The interface controller of claim 13 wherein the single set of rules corresponds to the network communications layer.

16. The interface controller of claim 1 wherein the devices comprise hospitality industry devices and the data access layer enables access by the information processing layer to a property management system.

17. The interface controller of claim 1 wherein the plurality of devices include one or more of a phone system, an entertainment/movie system, a security system, an environmental and energy management system, an accounting system, and a reservation system, and the property monitoring system generates a display that can include a user-selectable combination of device class and property for one or more of the devices.

18. A client system for enabling management of the operation of a plurality of associated devices at two or more properties by a remote interface controller via a wide area network, each of the plurality of devices belonging to one or more of a plurality of classes and having a unique communications protocol associated therewith, the client system comprising a client application for communicating with each of the plurality of devices and the interface controller via the wide area network, the client application also being for enabling the interface controller to interact with at least one database on behalf of all of the plurality of devices according to a single set of rules, the client application also for interfacing with a property monitoring system that can generate a display that can include a user-selectable combination of device class and property.

19. The client system of claim 18 wherein a subset of the plurality of devices comprise serial devices, the client system further comprising a serial communications layer configured to facilitate communication between the client application and each of the serial devices.

20. The client system of claim 18 wherein the client application is configured to communicate with the interface controller using eXtensible Mark-up Language (XML) and the TCP/IP protocol.

21. The client system of claim 20 wherein the client application is further configured to employ HTTP posts to a server associated with the interface controller to communicate with the interface controller.

22. The client system of claim 18 further comprising a network communications layer configured to facilitate communication between the client application and the interface controller via the wide area network.

23. The client system of claim 18 wherein the plurality of devices include one or more of a phone system, an entertainment/movie system, a security system, an environmental and energy management system, an accounting system, and a reservation system, and the client system allows a user-selectable combination of device class and property for one or more of the devices to be managed at the remote interface controller.

24. An information provider system for communication with an interface controller via a wide area network, the interface controller being for managing operation of a plurality of devices at two or more properties via the wide area network, each of the devices belonging to one or more of a plurality of classes and having a unique communications protocol associated therewith, the information provider system comprising a data access layer and at least one database, the data access layer being configured to facilitate interaction by the interface controller with the at least one database on behalf of all of the plurality of devices according to a single set of rules, the data access layer also being configured to facilitate interaction by the interface controller with a property monitoring system that can generate a display that can include a user-selectable combination of device class and property.

25. The information provider system of claim 24 further comprising a network communication layer configured to facilitate communication between the data access layer and the interface controller via the wide area network.

26. A system for managing operation of a plurality of devices at a plurality of properties via a wide area network, each of the devices having a unique communication protocol associated therewith, the system comprising:

a client application for communicating with each of the plurality of devices;

a network communications layer for communicating with the plurality of devices via the wide area network and the client application;

an information processing layer for communicating with the network communications layer, the information processing layer having a set of objects corresponding to each of the plurality of devices, the information processing layer also being for interacting with a data access layer on behalf of each of the plurality of devices using the corresponding objects, interaction between the information processing layer and the data access layer on behalf of all of the plurality of devices being governed by a single set processing layer to at least one database, wherein data generated by each the plurality of devices at each of the plurality of properties can be stored in the at least one database.

* * * * *

UNITED STATES PATENT AND TRADEMARK OFFICE
CERTIFICATE OF CORRECTION

PATENT NO. : 6,857,023 B2
DATED : February 15, 2005
INVENTOR(S) : Christian Rivadella, Paolo Hutchison and David Schwartz It is certified that error appears in the above-identified patent and that said Letters Patent is hereby corrected as shown below:

Column 21,
Line 7, replace "communication" with -- communicating --.

Column 22,
Line 19, replace "a single set processing layer" with -- a single set of rules, and the data access layer for facilitating access by the objects associated with the information processing layer --.

Signed and Sealed this

Seventh Day of June, 2005

JON W. DUDAS
*Director of the United States Patent and Trademark Office*